J. F. BUHR.
CHUCK.
APPLICATION FILED SEPT. 5, 1919.
1,392,678.
Patented Oct. 4, 1921.
4 SHEETS—SHEET 1.
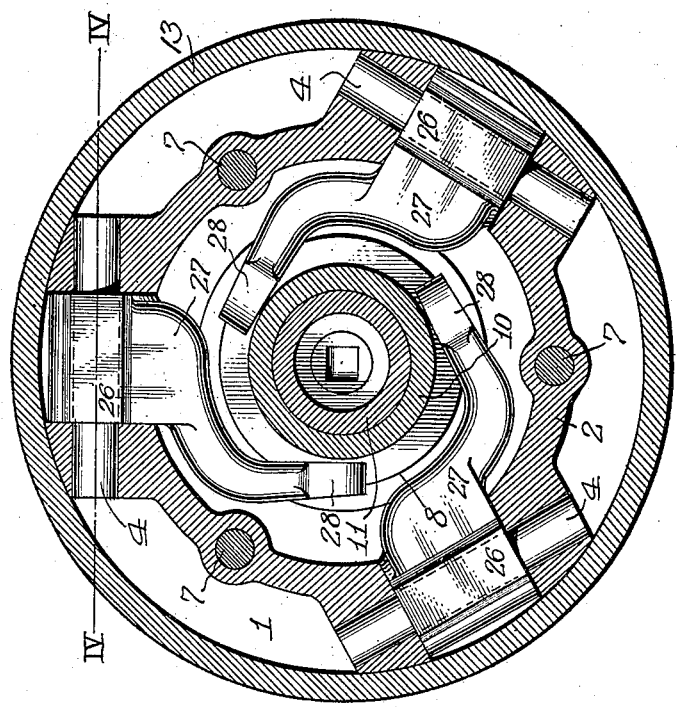
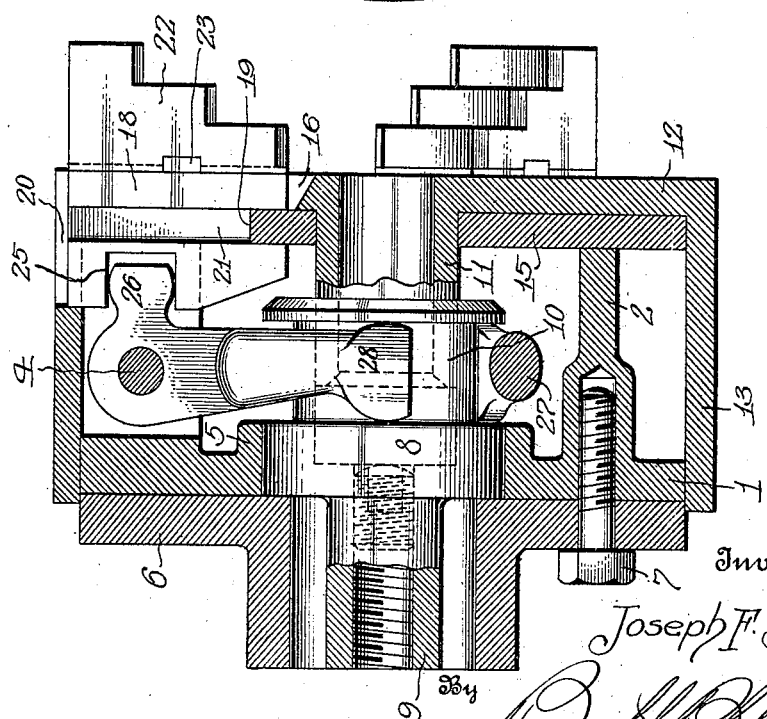
Inventor
Joseph F. Buhr,
By
Attorneys J. F. BUHR.
CHUCK.
APPLICATION FILED SEPT. 5, 1919.
1,392,678.
Patented Oct. 4, 1921.
4 SHEETS—SHEET 2.
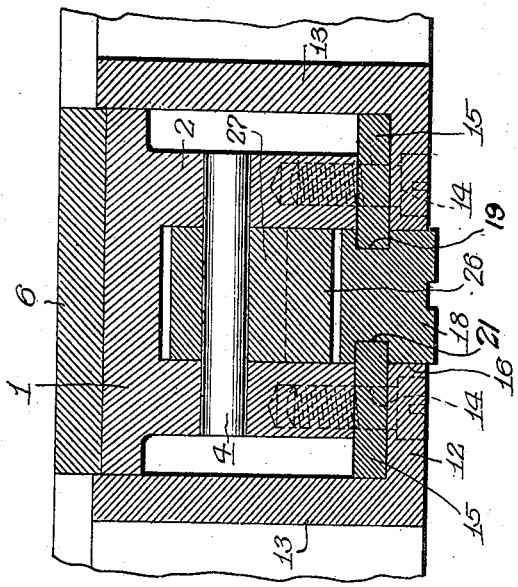
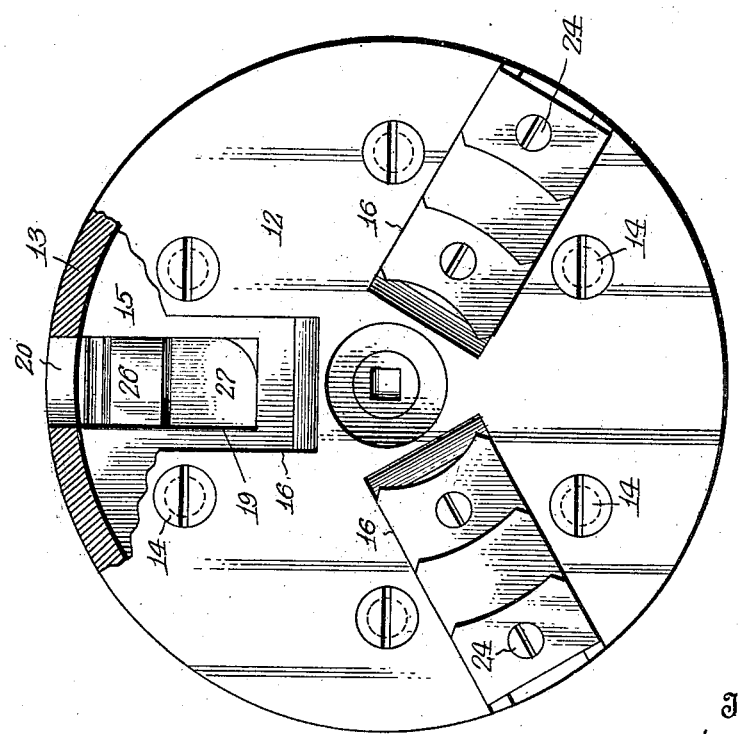
Inventor
Joseph F. Buhr,
By
Attorneys J. F. BUHR.
CHUCK.
APPLICATION FILED SEPT. 5, 1919.
1,392,678.
Patented Oct. 4, 1921.
4 SHEETS—SHEET 3.
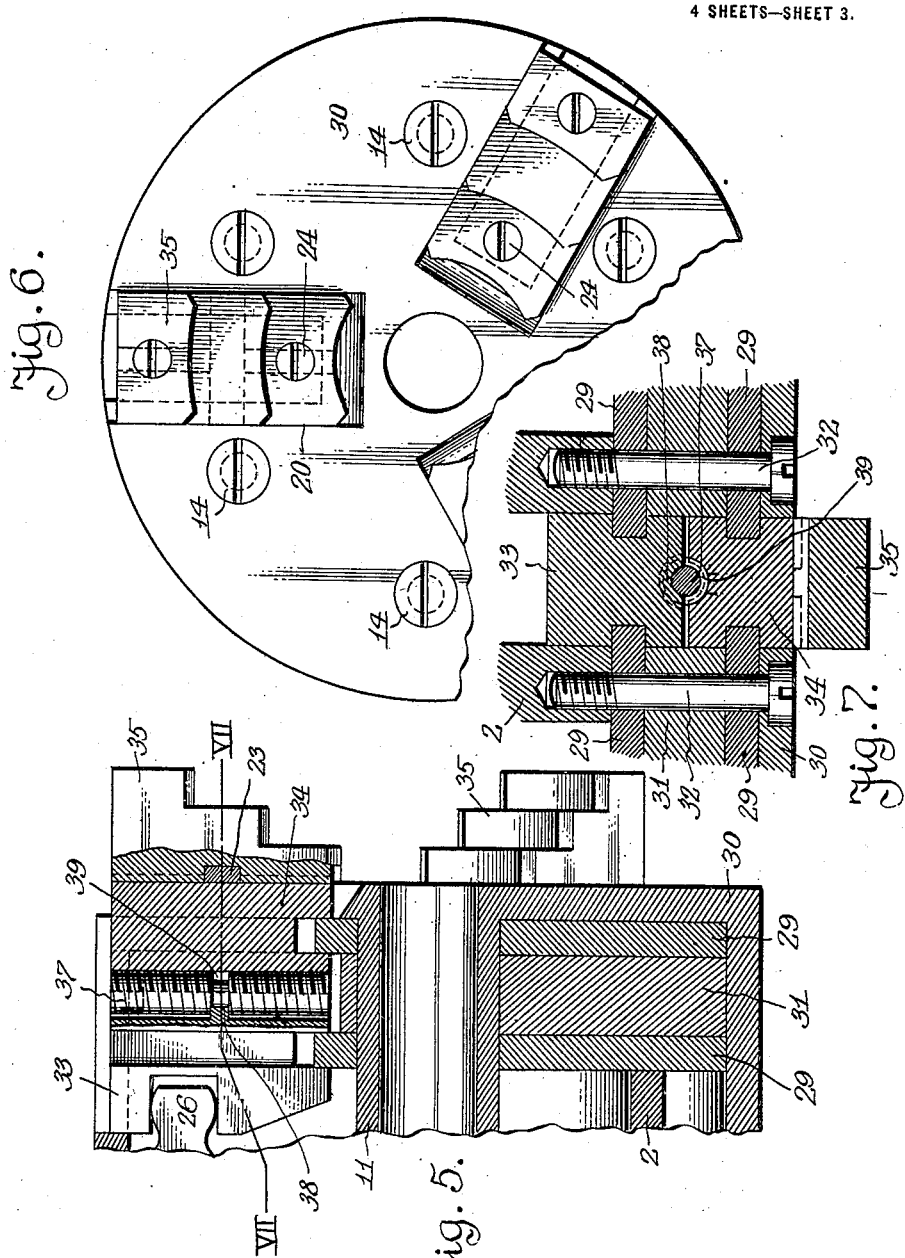

J. F. BUHR.
CHUCK.
APPLICATION FILED SEPT. 5, 1919.
1,392,678. Patented Oct. 4, 1921.
4 SHEETS—SHEET 4.
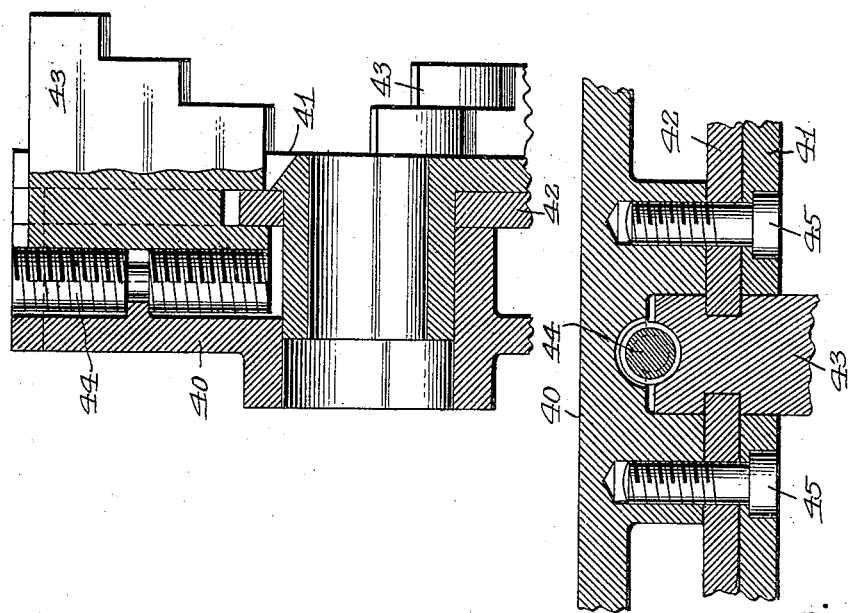
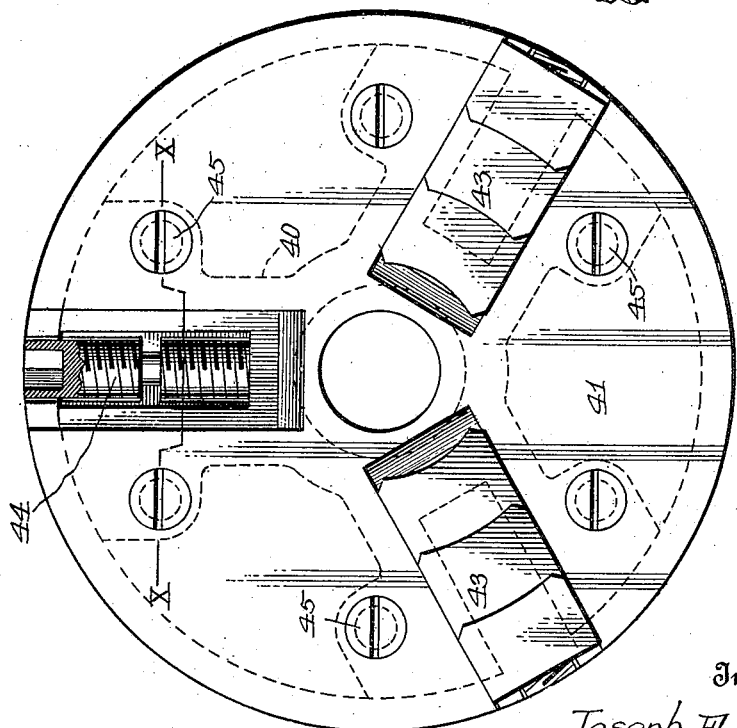
Inventor
Joseph F. Buhr,
By
Attorneys

UNITED STATES PATENT OFFICE.

JOSEPH F. BUHR, OF DETROIT, MICHIGAN.

CHUCK.

1,392,678.     Specification of Letters Patent.     Patented Oct. 4, 1921.

Application filed September 5, 1919. Serial No. 321,789.

*To all whom it may concern:*

Be it known that I, JOSEPH F. BUHR, a citizen of the United States of America, residing at Detroit, in the county of Wayne and State of Michigan, have invented certain new and useful Improvements in Chucks, of which the following is a specification, reference being had therein to the accompanying drawings.

In the construction of chucks, particularly that type used in connection with lathes and milling machines, it is the present practice to cut and mill a chuck head to provide guides for the chuck jaws, and when such guides are injured it is necessary to discard the entire chuck head. When such guides are worn it is necessary to resort to the use of liners and other devices to maintain the chuck jaws in accurate relation to the chuck head, but such liners and devices are unsatisfactory. In either instance the construction, from a manufacturing standpoint, is expensive, and I simplify the construction of chuck heads by providing removable guide plates for the chuck jaws, the guide plates being separable relative to the chuck heads so as to expedite manufacture in connection with each and at the same time afford perfect chuck jaw guides at all times without the necessity of discarding the chuck head.

My invention is further characterized by a chuck having radial jaws adapted to have movement imparted thereto from a reciprocable element, for instance, an element pneumatically actuated, and the means employed for articulating the jaws relative to the reciprocable element permits of a maximum adjustment being made with a minimum expenditure of power. This is brought about by novel jaw levers which have the greater part thereof disposed tangentially relative to the reciprocable element in contradistinction to levers entirely disposed at a radius relative to the reciprocable element.

Again, my invention resides in the novel guide plate for master and face chuck jaws, both of which may be adjusted independently of any mechanism employed for adjusting all of the jaws in synchronism.

My invention will be better understood from the following description in connection with the drawing, wherein—

Figure 1 is a longitudinal sectional view of the chuck;

Fig. 2 is a cross sectional view of the same;

Fig. 3 is an end view of the chuck partly broken away and partly in section;

Fig. 4 is a horizontal sectional view taken on the line IV—IV of Fig. 2;

Fig. 5 is a longitudinal sectional view of a portion of a modified form of chuck;

Fig. 6 is an end view of the same;

Fig. 7 is a horizontal sectional view taken on the line VII—VII of Fig. 5;

Fig. 8 is an end view of another chuck in accordance with my invention;

Fig. 9 is a longitudinal sectional view of a portion of the same; and

Fig. 10 is a horizontal sectional view taken on the line X—X of Fig. 8.

Reference will first be had to Figs. 1 to 4 inclusive showing a cylindrical chuck body that is formed to provide an inner wall 1 and a circumferentially disposed wall 2 which is set in from the marginal edges of the inner wall 1 and provided with radially disposed sets of bearings 3 for jaw pivot pins or trunnions 4.

The inner wall 1 of the chuck body has a concentric guide 5 and mounted against said wall is an end plate 6 which may be connected to the walls 1 and 2 by a plurality of screw bolts 7 or other fastening means. The end plate 6 serves as an abutment for a piston head 8 slidable in the guide 5, and said piston head has a coupling sleeve 9 for a reciprocable piston or operating rod (not shown). The piston head 8 is provided with a wide peripheral groove 10 and said head is slidable on a guide sleeve 11 axially of a face plate 12 forming part of a chuck head 13 which is fitted over the chuck body and held in engagement therewith by a plurality of screw bolts 14 extending through the chuck face plate 12 into the walls 2 of the chuck body. The screw bolts 14 are also employed for retaining a circular removable guide plate 15 between the wall 2 and the face plate 12, as best shown in Fig. 1. By reference to Fig. 4, it will be noted that the bearings 3, besides engaging the inner wall of the chuck head 13, engage the guide plate 15 and in consequence of this construction, the guide plate is normally held and braced within the chuck head.

The chuck face plate 12 is slotted, as at 16, to provide clearance for shiftable jaws 18, and these jaws are shiftable in slots 19 and 20 provided therefor in the guide plate 15 and the chuck head 13 respectively.

The parallel walls of the guide plate slots 19 afford guides for the shiftable jaws 18 and extend into grooves 21 provided therefor in the side walls of the shiftable jaws, while the inner ends of said jaws are also grooved to receive the end wall of each of the slots 19, as best shown in Fig. 1. The shiftable jaws 18 slide between the bearings 3 and stepped face jaws 22 may be connected to the shiftable jaws 18 by transverse keys 23, screws 24 or other fastening means.

The inner faces of the shiftable jaws 18 have notches 25 to receive the rock heads 26 of levers 27 supported by the pivot pins 4, said levers fitting between the bearings 3, as best shown in Fig. 2. The inner ends of the levers 27 are offset and enter the grooves 10 of the piston head 8, said levers having the inner ends thereof disposed at a tangent to the axis of the piston head and provided with rock heads 28 within the groove 10, so that a reciprocable movement of the piston head 8 will impart a rocking movement to the lever 27 and cause said levers to shift the jaws 18 in a radial direction to and from the axis of the chuck head. By having the levers 27 disposed at a tangent to the piston head 8, in contradistinction to a radial disposition of said levers, a greater degree of leverage is obtained in moving the jaws 18 and it is in view of this constructive arrangement of parts that a minimum amount of power may actuate the jaws 18.

Since the slotted guide plate 15 is seated within the chuck head 13 against the face plate 12 thereof and braced by the wall 2, said guide plate is as though integral with the chuck head and affords positive guides for the shiftable jaws 18. However, should the guide plate be injured it is an extremely easy matter to remove said plate and substitute another. The guide plate readily coöperates with the face plate 12, the head 13, and the bearings 3 in firmly bracing the shiftable jaws 18 so that said jaws may be evenly shifted in synchronism by the offset levers 27 and the reciprocable piston 8.

In Figs. 5, 6 and 7, two slotted guide plates 29 are within the chuck head 30 and separated by a filler member 31, which is also slotted, similar to the guide plates 29 and said chuck head. These elements are maintained assembled by screw bolts 32, as shown in Fig. 7, and the shiftable jaw is made in two parts 33 and 34, with the latter supporting a stepped jaw 35. The jaw parts 33 and 34 are grooved to receive the guide plates 29 and the confronting faces of the jaw parts 33 and 34 are slightly separated by a screw 37, which is in threaded engagement with the jaw part 34, but rotatably held relative to the jaw part 33 by a tongue 38 of said jaw part extending into an annular groove 39 in the screw 37. The part 33 is adapted to be shifted in a radial direction, as in the preferred form of construction, and it is through the medium of the screw 37 that the jaw part 34 may be shifted relative to the jaw part 33.

A simple form of chuck has been shown in Figs. 8, 9 and 10, wherein 40 denotes a chuck body, 41 a slotted face plate, 42 a slotted guide plate for jaws 43, and 44 rotatable screws supported by the chuck body and adapted for shifting the jaws 43, said screws being used in lieu of the lever 27 previously referred to. The face plate 41 and guide plate 42 are held relative to the chuck body 40 by screw bolts 45, and this simple constructive arrangement of parts affords a durable chuck head from which the guide plate 42 may be removed, and another substituted therefor when occasion so requires.

It is thought that the operation and utility of my improvement will be apparent without further description, and while in the drawings there are illustrated the preferred embodiments of my invention it is to be understood that the structural elements are susceptible to such variations and modifications as fall within the scope of the appended claims.

What I claim is:—

1. In a chuck head having a plurality of jaws, a removable unitary guide plate for said jaws completely housed within said chuck head.

2. In a chuck, a chuck body having a face plate, jaws, and detachable unitary means housed within said chuck body against the face plate thereof affording guides for said jaws.

3. A chuck as characterized in claim 2, wherein means carried by the face plate of said chuck body assists in correctly positioning said unitary means.

4. In a chuck, a body, a head on said body, jaws slidable relative to said body and head, and a guide plate for said jaws positioned between said body and said head.

5. A chuck as characterized in claim 4, wherein said head has an axial guide on which said guide plate is mounted.

6. In a chuck, a body, a chuck head on said body, jaws slidable relative to said body and head, a guide plate for said jaws positioned between said body and said head, a guide sleeve on said chuck head extending through said guide plate, and reciprocable means extending into said body and over the guide sleeve of said chuck head adapted to slide said jaws.

7. A chuck as characterized in claim 6, wherein an end plate on said chuck body serves as an abutment for said reciprocable operating means, and said operating means slides in said body independently of said end plate.

In testimony whereof I affix my signature in the presence of two witnesses.

JOSEPH F. BUHR.

Witnesses:
KARL H. BUTLER,
ANNA M. DORR.